April 21, 1959 H. W. CAIN 2,883,461

CONTROL CIRCUITS AND APPARATUS FOR TELEPHONE ANSWERING AND RECORDING DEVICES

Filed July 13, 1954 2 Sheets-Sheet 1

INVENTOR.
HARRY WILSON CAIN
BY
Van Deventer & Shirley
ATTORNEYS

INVENTOR.
HARRY WILSON CAIN
BY
Van Deventer & Shively
ATTORNEYS

United States Patent Office 2,883,461

Patented Apr. 21, 1959

2,883,461

CONTROL CIRCUITS AND APPARATUS FOR TELEPHONE ANSWERING AND RECORDING DEVICES

Harry Wilson Cain, New York, N.Y.

Application July 13, 1954, Serial No. 442,945

7 Claims. (Cl. 179—6)

This invention relates to control circuits and apparatus for telephone answering and recording devices.

Telephone answering and recording devices of the type referred to herein are devices which when connected to a subscriber's telephone line or other communication circuit will automatically go into operation when a ringing signal is given and answer an incoming call by means of a record left in the device. After delivering said message to the calling party, the latter may record a message he wishes to leave, in the device, which then disconnects itself from the line circuit and awaits the next call. If desired, the device can be used for answering the telephone only, and in that case the incoming message recording feature is not used.

It will be understood that the invention herein disclosed is applicable to either the complete combination device which will answer incoming calls and record incoming messages, or a device which will answer incoming calls only.

Hereafter such devices, whether for answering and recording or answering only, will be termed Peatrophones, which is the trade name for a device of the class described now in extensive use throughout the United States.

In connection with the installation of Peatrophones on existing telephone lines, it has become necessary to connect them with existing telephone instruments used with various classes or types of circuits, for example:

(*a*) with individual lines with or without ground;
(*b*) two-party flat rate;
(*c*) two-party flat and message rate;
(*d*) four-party service; and
(*e*) various lines employing multi-frequency ringers of the Harmonic, Decimonic and Synchromonic series and other selective ringer systems.

One of the objects of the instant invention is to provide a Peatrophone that can be used with the standard telephone instruments and accessories now employed and on any type or classes of service without the necessity of having to rewire any of the interior parts of the Peatrophone, using the standard telephone instrument, cords and other accessories without change.

Another object is to provide an improved starting circuit for Peatrophones which can be used with any of the aforementioned classes of service.

Another object is to provide an improved disconnect circuit for use in Peatrophones or other devices of the class described.

Other objects and advantages of the invention will more fully hereinafter appear, reference being made to the following specification and the accompanying drawings wherein by way of illustration is shown some typical connections of Peatrophones to various types of telephone lines, using a typical Peatrophone circuit. It will be understood that the latter is merely illustrative and not limitative as many changes can be made in the Peatrophone circuit without, however, departing from the appendant claims.

Figure 1:
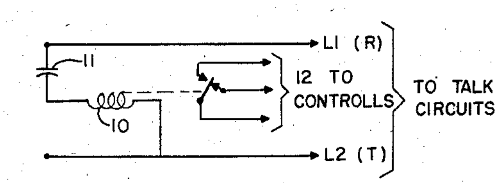
Figure 1 is a circuit diagram of a conventional type of ringing circuit.

Devices of the class described, including the Peatrophone, all employ some basic starting circuit. Such a circuit is shown in Fig. 1 wherein the ringing relay 10 in series with a condenser 11 is connected across the line terminals R and T to which the telephone line is connected. The relay 10 by means of its contacts, generally denoted by the numeral 12, controls the starting of the device when the relay 10 is operated by ringing current.

It has heretofore been the practice to connect the elements in Fig. 1 to the line circuit terminals in such a manner that in order to eliminate the condenser 11, necessary with some classes of service, the device had to be opened and the interior circuits rewired. Such permanent interior connections also made it difficult to connect the instrument for various classes of service as will more fully hereinafter appear.

Figure 2:
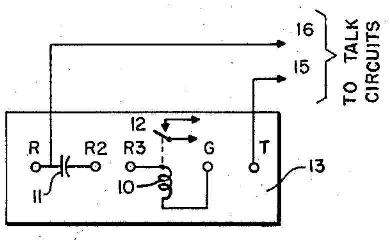
Figure 2 is a circuit diagram of the improved ringing circuit constituting one of the features of the invention.

The foregoing difficulty has been overcome by the instant invention wherein a suitable terminal block is provided to which the basic elements of the ringing circuit as shown in Fig. 1 are connected. Such an improved arrangement is shown in Fig. 2 wherein the terminal block or strip 13 is provided with at least five terminals which are connected to the relay 10 and condenser 11, as shown, thus making possible any arrangement of the ringing circuit elements necessary to accommodate various types of subscribers' circuits to which the devices may be connected, all without making any change whatever in the interior wiring of the Peatrophone or equivalent instruments.

Figure 3:
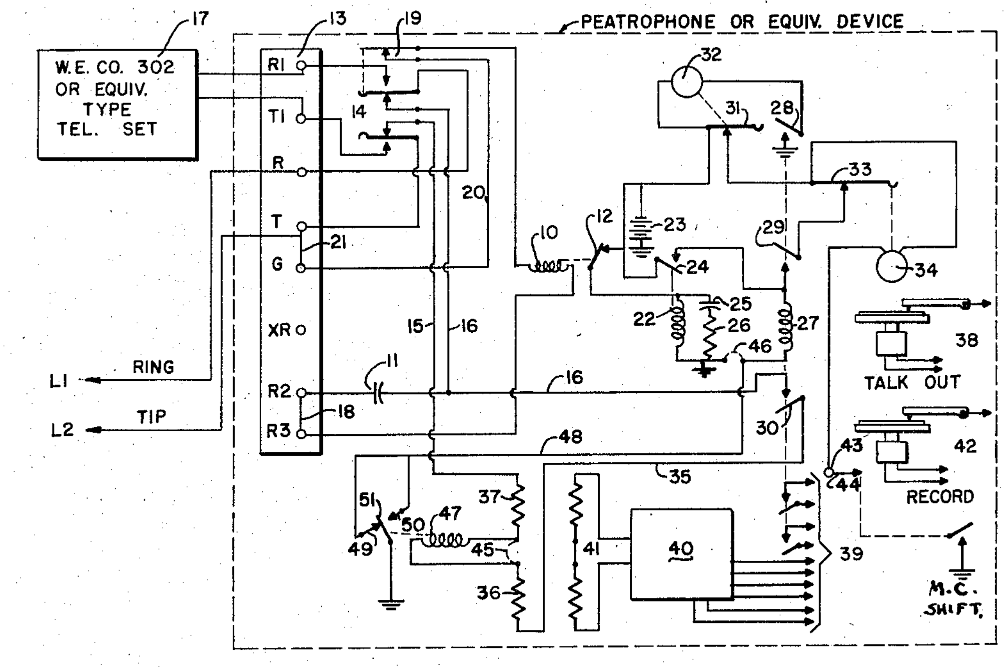
Figure 3 is a circuit diagram of a telephone answering and recording device incorporating the ringing circuit of Figure 2.

While in many answering and recording devices the basic circuit shown in Fig. 1 has been employed, an improved ringing circuit is shown in Fig. 3 wherein other circuits are shown which, taken together for the sake of illustration, disclose a complete telephone answering and recording device.

The incoming telephone L–1, which may be regarded as the ring line, and L–2 as the tip line, connect to terminals R and T respectively of strip 13, and these terminals are permanently connected to the long springs of the switch key 14 which normally make contact with the inside springs thereof which, via conductors 15 and 16, connect to other parts of the device. When the key 14 is operated, the long springs thereof connect L–1 and L–2 directly to terminals R–1 and T–1 which, in turn, are connected to any standard type of telephone instrument indicated by the numeral 17. For the sake of illustration, this may be a Western Electric No. 302 sub-set.

It will be observed that when the key 14 is operated to connect a telephone to the line, all other equipment in the Peatrophone is disconnected from the line.

When it is desired to use the telephone answering and recording device, the key 14 is left in normal position as shown in Fig. 3.

Figure 4:
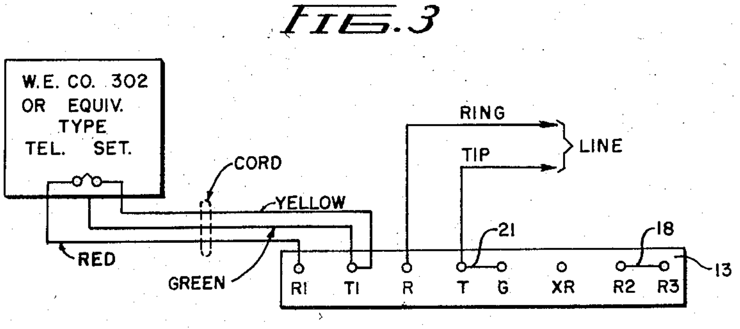
Figure 4 is a diagram of the connections of the device (Figure 3) when used with an individual telephone line, with or without ground.

Assuming that the Peatrophone is to be used in connection with an individual subscriber's line without ground, the connections external to the Peatrophone are shown in Fig. 4, and the operating circuits of the Peatrophone may be as follows:

*Ringing circuit*

From the ring line to terminal R through the normally closed contacts of key 14 to conductor 16 to condenser 11 to terminal R–2 on the connector strip 13 and then via strap wire 18 to terminal R–3, the winding relay 10 to the normally closed contact 19 in key 14, via conductor 20 to the G terminal on strip 13, via strap 21 to terminal T, and to the tip line.

The requirements for a satisfactory ringing circuit are that the relay 10 must respond to a current of not less than two milliamperes but the relay must not close unless there is a steady ringing current of a minimum of .2 of a second but will always close at a maximum of .5 of a second. This arrangement is necessary to provide for the short rings sometimes experienced on manually operated switchboards and to prevent the machine from starting due to "strays" and "transients."

It is at once obvious that in order to meet the above requirements a delay circuit in the starting circuit is desirable, and, referring to Fig. 3, this is provided by connecting the winding of a delay relay 22 between the normally closed contacts 12 of the ringing relay 10 and a suitable source 23 of direct current so that normally the contacts 24 of relay 22 are held open as shown.

Upon the operation of relay 10 the circuit through relay 22 is opened at contacts 12 of the ringing relay. The delay relay 22 thereupon closes its contacts 24, but these close slowly to afford the desired delay by reason of the condenser 25 and the resistance 26 bridged to cross the winding of the relay 22 as shown.

To obtain the operating characteristics above set forth, and using ordinary telephone type relays, ringing relay 10 may have a D.C. resistance of 5,000 ohms and an impedance of approximately 150,000 ohms at 1,000 cycles; the delay relay 22 has a D.C. resistance of approximately 1,200 ohms; the condenser 25 is 50 mf. (15 volts) and the resistance approximately 3,000 ohms D.C. Such a combination of elements will produce the delay effect previously described.

Upon closure of the contacts 24 of the delay relay, the winding of the starting relay 27 is energized, and said relay closes its contacts 28, 29 and 30. The supply 23 is now connected through the normally closed contacts 31 of timer 32, the normally closed contacts 33 of timer 34 and the locking contacts 29 of relay 27 and through the winding of said relay, thereby holding same in energized condition independently of contacts 12 and 24 in relays 10 and 22.

Upon the closure of contacts 30 on the starting relay, a talking circuit is completed from the ring line through terminal R, key 14, conductor 16, conductor 35 to the windings 36, 37 of a repeating coil and from the upper end of said last winding via conductor 15 to terminal T and the tip side of the line, thus bridging the repeating coil across the line circuit and placing the device in a position to transmit and record speech.

The outgoing speech is provided by means of a "talkout" phonograph 38, the talking circuits and motor of which are controlled by some of the contact elements and circuits generally indicated at 39, whereby the talkout record in the phonograph 38 is transmitted via the amplifier 40 and repeating coil windings 41 to the repeating coil windings 36, 37 and thence to the line.

At the proper time, that is to say, at the end of the talkout period, the "record" phonograph 42 controlled by the means 39 is placed in operation, and any speech made by the calling subscriber will be recorded in the phonograph 42.

It will be noted that when the starting relay contact 28 closed, it applied current from the source 23 to the motor 32 of a timer of the ordinary automatic resetting type. The contacts of this timer are set to run for an over-all period sufficiently long to permit the delivery of the talkout record and the recording of the incoming message and then contacts 31 open thereby breaking the circuit through the contacts 29 of relay 27 which thereupon will open its contacts, restoring all parts to normal non-operating condition. This timer 32 may be referred to as the limit timer.

A second timer motor 34 operates the normally closed contacts 33. This automatic reset timer 34 is connected to terminal 43 which normally connects to the conductor 44 to a control circuit whereby this timer begins to operate at the time the shift over is made from "talkout" to "record" so that by properly setting the timer 34 the length of the recorded message can be determined. When contacts 33 open at this time all circuits are restored to normal by release of relay 27. This operation takes place within the limits of the time set by the limit timer 32.

In the event that the connection 44 is used to timer 34, then a strap shown in dotted lines at 45 connects the inner ends of the repeating coil windings 36, 37, and relay 46, the operation of which is to be presently described, is not used.

For a complete operation of a typical Peatrophone circuit insofar as the mid-cycle shift from "talkout" to "record" is concerned, reference may be made to U.S. Patents Nos. 2,673,241 and 2,673,242 dated March 23, 1954. The connections to the controls 39 and 44 are not herein shown and described in detail as they play no part in the control circuits herein described except to the extent noted.

*Disconnection of Peatrophone under control of calling subscriber*

If it is desired to give the calling subscriber control of the Peatrophone so that when the calling subscriber hangs up his receiver the Peatrophone will disconnect at any time in its cycle, the strap 46 is removed from the connection to the coil of relay 27 and the strap 45 is removed from the inside terminals of the repeating coil windings 36, 37, thereby placing the winding of a control relay 47 in series with the line terminals R, T, as shown, upon the closing of contacts 30 in the starting relay 37. The wire 48 is now connected from the coil of relay 27 to contacts 49, 50, of relay 47.

It will now be seen that upon receipt of an incoming call and the operation of starting relay 27 as previously described (except that said relay now gets its ground at 49, relay 47) that when the contact 30 of relay 27 closes there is current on the line circuit relay 47 in series therewith which moves its contact 51 out of contact with 49 and into contact with 50.

Contact 51 closes on 50 before it breaks from 49, but upon releasing, contact 51 breaks from 50 before it contacts 49, thus momentarily opening the circuit through the relay 27 and restoring all circuits to normal.

Relay 47 is operated by any break in the line circuit, or by a change of state therein such as a reversal of the direction of D.C. current flow or the like; various known types of quick-make-slow break relays may be used at 47 depending upon the exchange equipment used at the C. B. Central Office in which the line L–1, L–2 terminates.

*Universal connections*

In Fig. 4 are shown the connections to the terminal block 13 in the Peatrophone when using the same for subscriber's individual line with or without ground. The connections as shown are without ground, with the straps 18 and 21 normally in place.

Figures 5, 6:
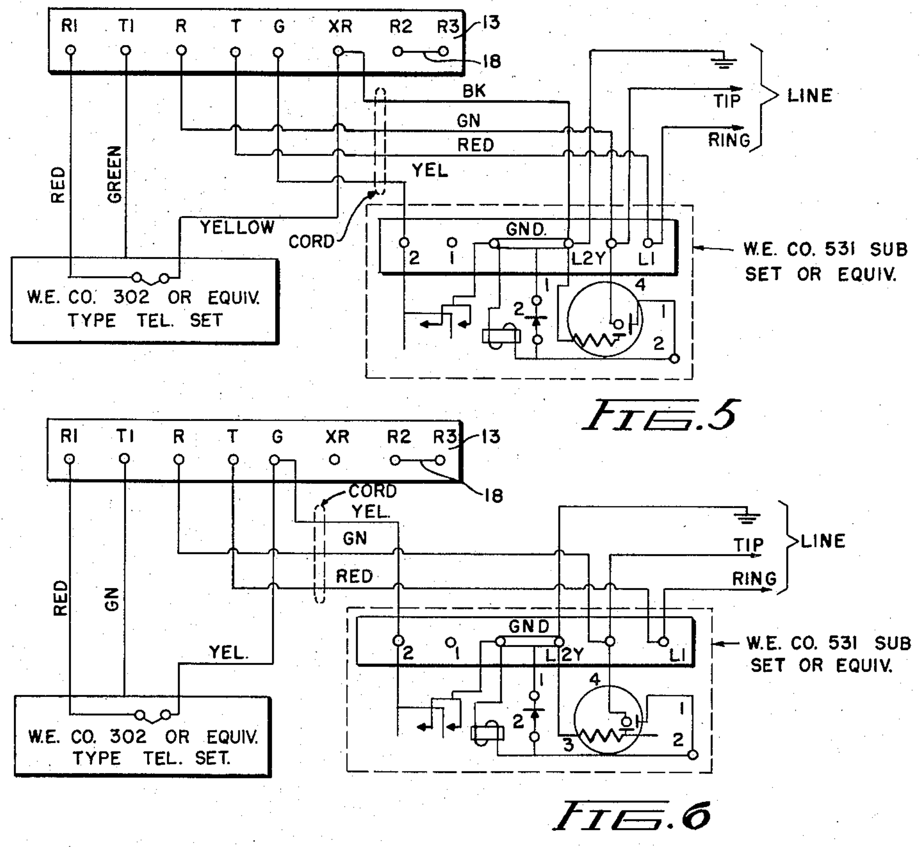
Figure 5 is a diagram of the connections of the device (Figure 3) when used with a two-party message line, tip party.
Figure 6 is a diagram of the connections of the device (Figure 3) when used with a two-party flat rate, tip party; four-party minus party on R; four-party minus party on T; four-party plus party on R; and four-party plus party on T.

In Fig. 5 are shown the connections to the terminal block 13 for the Peatrophone when used on a two-party message line for the tip party connection. Here the strap 21 is removed and the Peatrophone is connected up to the standard Western Electric sub-set No. 531C, as shown.

In Fig. 6 are shown the connections for two-party flat rate tip party, these being much the same as the connections shown in Fig. 5, except that in Fig. 5 the Western Electric sub-set No. 531C is connected by a four conductor cord with the terminal strap 13 whereas in Fig. 6 a three conductor cord is employed.

The arrangement shown in Fig. 6 can also be used for two-party flat and message rate ring party, four-party service minus party on R, four-party service minus party on T, four-party service plus party on R, and four-party service plus party on T in a manner that will be obvious.

Figure 7:
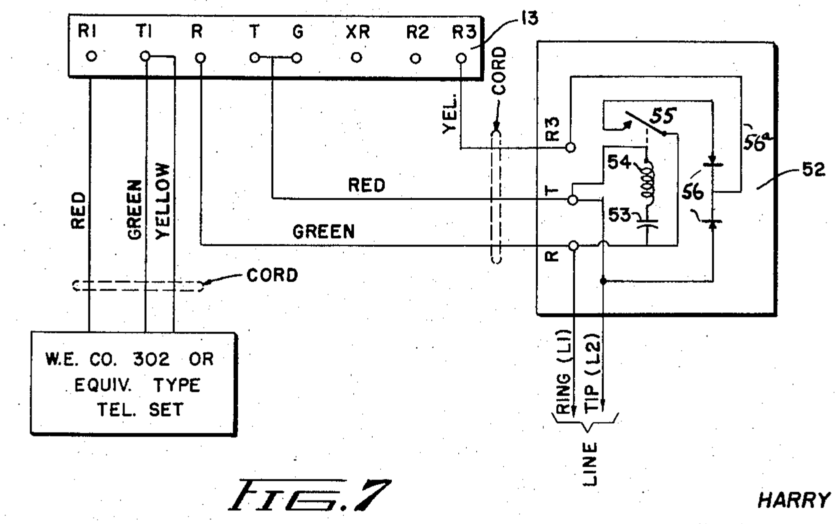
Figure 7 is a diagram of the connections of the device (Figure 3) with Harmonic, Decimonic or Synchromonic ringers.

In Fig. 7 are shown the connections for standard Western Electric No. 302 sub-set or equivalent telephone, with the Peatrophone terminal block 13 and with a cabinet spaced apart therefrom generally indicated by the numeral 52 containing a condenser 53 in series with the winding of a suitable relay 54, said condenser and relay being connected across the tip and ring telephone line.

The contacts 55 of relay 54 close when the relay is actuated placing a rectifier 56 across the telephone line as shown, a tap being taken off the rectifier as shown at 56*a* which extends to the terminal R–3 of the Peatrophone.

By reference to Fig. 3 it will be seen that a circuit may be traced from the ring side of the line through the contacts 55, the rectifier 56 to the terminal R–3 of the Peatrophone, through the winding on the ringing relay 10 therein, through the terminal G, through the strap 21 to the terminal T, and thence to the tip side of the line, thus placing the relay 10 in a D.C. circuit, rectifier 56 serving to rectify the incoming A.C. ringing current and its application to relay 10, which upon opening its contacts 12 operates as previously described in connection with Fig. 3.

The relay 54 is of any desired construction to operate on any desired frequency such as is used with the Harmonic, Decimonic and Synchromonic series of ringers, and it will be obvious from the study of Fig. 7 that by making the necessary line and ground connections thereto that the frequency relay 54 in box 52 may be operated either in full metallic or between either line to ground, therefore enabling the terminal and cord arrangement shown to be used for various classes of service.

It will be seen from the foregoing that this invention provides means for connecting a standard Peatrophone having the eight terminal connecting block or strip 13 to a large majority of the nearly 50,000,000 telephones in use without any change whatever in the interior wiring of the Peatrophone, and that the arrangement is such that any standard telephone using a two or three conductor cord may be used, together with auxiliary subsets such as the Western Electric Company's No. 531C or equivalent, or the frequency ringer sub-sets indicated by the numeral 52 in Fig. 7, with a frequency ringer in the WE 302 telephone set.

In connection with the figures showing the connections of the circuits to the Peatrophone terminals, it will be noticed in some instances it is merely necessary to reverse the line wires in order to meet the ringing conditions incident to tip and ring party selection. Such changes in these connections are obvious and well-known, and they are not herein discussed in detail. It will be noted that they do not require any change whatever in the Peatrophone terminals.

A terminal X—R will be noted on the strip 13. This is provided for the convenience of the installer and in many cases where a three conductor cord is used instead of a four conductor cord, this terminal can be used for the dead conductor not used, or for any other purpose.

What is claimed is:

1. A control circuit for a telephone answering device including a ringing current relay having a winding and contacts and responsive to alternating current; a delay relay having a winding and contacts and responsive to direct current controlled by said ringing current relay contacts and normally energized with said contacts of said delay relay held open; means associated with said delay relay to delay the closing of the contacts thereof upon breakage of said direct current to said delay relay by said ringing current relay contacts; and means controlled by said contacts of said delay relay for starting the cyclic operation of a telephone answering device.

2. In combination, a communication line circuit; a first relay responsive to alternating current flowing in said circuit and having contacts; a rectifier; a second relay having contacts and a winding; a branch circuit connected to said line circuit, said branch circuit including said contacts, said rectifier and the winding of said second relay whereby upon energization of said first relay by alternating current flowing in said line circuit, said current is rectified to direct current in said branch circuit and said second relay is operated by said rectified current; and means controlled by said contacts in said second relay for delivering a recorded message to said line circuit.

3. A control circuit for telephone answering devices, in combination with a telephone line circuit, a selective relay responsive to ringing current of one frequency only and connected to said line circuit, said relay having contacts; a ringing current relay responsive to a relatively broad band of frequencies and having a winding and contacts; a circuit including said line circuit, said first contacts and said winding of said ringing current relay; a telephone answering device; and means controlled by said contacts on said ringing current relay for connecting said telephone answering device to said line circuit.

4. The combination as claimed in claim 3 wherein said contacts in said ringing current relay are normally closed and said means includes a starting relay having a winding serially included in circuit with said normally closed contacts on said ringing current relay; and a source of current serially included in circuit with said starting relay winding and said normally closed contacts.

5. A control circuit for telephone answering devices, in combination with a telephone line circuit, a selective relay responsive to ringing current of one frequency only, said relay having contacts; a ringing current relay having a winding; a circuit including said contacts and winding and connected to said line circuit whereby said ringing current relay may be operated by current flowing in said line circuit, said ringing current relay having contacts; a source of current; a starting relay having a winding serially included in circuit with said current source and said ringing current relay contacts, said starting relay having contacts; a reproducing phonograph; and means controlled by said starting relay for connecting said phonograph to said line circuit to deliver a recorded message thereto, said means including a control relay having a winding serially included in said line circuit, said control relay having contacts in circuit with said winding of said starting relay whereby the latter is controlled by said control relay.

6. A control circuit for telephone answering devices, in combination with a telephone line circuit; a ringing current relay responsive to ringing current and having a winding connected to said line circuit, said relay having contacts; a source of current; a starting relay having a winding serially included in circuit with said current source and said ringing current relay contacts, said starting relay having contacts; a reproducing phonograph; and means controlled by said starting relay for connecting said phonograph to said line circuit to deliver a recorded message thereto, said means including a control relay having a winding serially included in said line circuit, said control relay having contacts in circuit with said winding of said starting relay whereby the latter is controlled by said control relay, said combination including a repeating coil having a winding connected to said phonograph and another winding serially included in circuit with the winding of said control relay.

7. In combination with a telephone line circuit, a phonograph, a ringing current relay having a normally closed single pair of contacts and having a winding connected across said telephone line circuit, a second relay having contacts and a winding, a repeating coil having a winding adapted to be connected across said telephone line circuit in series with said winding of said second relay, and means controllable by said contacts of said ringing current relay to operatively connect said phonograph via said repeating coil to said telephone line circuit and controllable by said contacts of said second relay to disconnect said phonograph from said telephone line circuit.

References Cited in the file of this patent

UNITED STATES PATENTS

| | | |
|---|---|---|
| 2,525,763 | Beatty | Oct. 17, 1950 |
| 2,673,241 | Van Deventer et al. | Mar. 23, 1954 |
| 2,743,315 | Van Deventer | Apr. 24, 1956 |